United States Patent
Brasch

(10) Patent No.: US 11,704,380 B1
(45) Date of Patent: Jul. 18, 2023

(54) SUPPLY OF IMAGE ASSETS FOR PRESENTATION AT A MOBILE DEVICE

(71) Applicant: Amazon Technologies, Inc., Seattle, WA (US)

(72) Inventor: Erin Matthew Brasch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 16/904,350

(22) Filed: Jun. 17, 2020

(51) Int. Cl.
| | |
|---|---|
| *G06F 17/00* | (2019.01) |
| *G06F 16/955* | (2019.01) |
| *G06F 16/583* | (2019.01) |
| *G06F 16/538* | (2019.01) |
| *G06F 16/532* | (2019.01) |
| *G06F 40/106* | (2020.01) |
| *G06F 16/14* | (2019.01) |

(52) U.S. Cl.
CPC .......... *G06F 16/9558* (2019.01); *G06F 16/14* (2019.01); *G06F 16/532* (2019.01); *G06F 16/538* (2019.01); *G06F 16/5838* (2019.01); *G06F 16/5854* (2019.01); *G06F 16/5862* (2019.01); *G06F 40/106* (2020.01)

(58) Field of Classification Search
CPC .... G06F 16/9558; G06F 16/14; G06F 16/532; G06F 16/538; G06F 16/5838; G06F 16/5854; G06F 16/5862; G06F 40/106
See application file for complete search history.

(56) References Cited

U.S. PATENT DOCUMENTS

| | | | | |
|---|---|---|---|---|
| 2010/0115428 | A1* | 5/2010 | Shuping | G06F 3/0481 715/277 |
| 2012/0299955 | A1* | 11/2012 | Fagans | H04N 1/00442 345/619 |
| 2013/0013992 | A1* | 1/2013 | Jalkanen | G06F 16/9558 715/207 |
| 2014/0122567 | A1* | 5/2014 | Suryavanshi | G06F 16/9558 709/203 |
| 2015/0242522 | A1* | 8/2015 | Lin | G06F 40/134 715/205 |
| 2015/0248429 | A1* | 9/2015 | Pregueiro | G06F 16/9577 715/202 |

(Continued)

*Primary Examiner* — Laurie A Ries
(74) *Attorney, Agent, or Firm* — Eversheds Sutherland (US) LLP

(57) ABSTRACT

Technologies are provided to supply image assets for presentation at a client device. Some embodiments include a computing device that can determine that multiple image assets to be presented in a user interface are unavailable within a non-volatile storage device of the computing device. The computing device can then generate a request for an image sprite containing the multiple image assets, and can send the request to a content source platform. The request identifies the multiple image assets. The computing device can receive, from the content source platform, the image sprite and metadata corresponding to the image sprite. The metadata defines attributes of the multiple image assets. The computing device can store the metadata in the non-volatile storage device, and can extract, using the metadata, the multiple image assets from the image sprite. The computing device can present the multiple assets during presentation of the user interface.

20 Claims, 5 Drawing Sheets

(56) References Cited

U.S. PATENT DOCUMENTS

| | | | |
|---|---|---|---|
| 2015/0310126 A1* | 10/2015 | Steiner | G06F 16/9574 |
| | | | 715/204 |
| 2016/0182606 A1* | 6/2016 | Kaasila | G06F 40/109 |
| | | | 715/269 |
| 2017/0230433 A1* | 8/2017 | Carlos | H04L 65/403 |
| 2018/0335899 A1* | 11/2018 | Le Bleis | G06F 16/53 |
| 2019/0050427 A1* | 2/2019 | Wiesel | G06T 7/11 |
| 2019/0238952 A1* | 8/2019 | Boskovich | G06F 16/433 |
| 2020/0364901 A1* | 11/2020 | Choudhuri | G06T 19/006 |
| 2021/0157970 A1* | 5/2021 | Behar | G06F 40/106 |
| 2021/0217270 A1* | 7/2021 | Brown | G07F 17/3225 |
| 2022/0163455 A1* | 5/2022 | Pollak | G06V 40/107 |

\* cited by examiner

SUPPLY OF IMAGE ASSETS FOR PRESENTATION AT A MOBILE DEVICE

BACKGROUND

Images are an integral part of many digital services that include functionality to browse and/or search a catalog of content or service, such as digital content. The digital services can include, for example, digital marketplaces, digital matchmaking services, digital forums and other types of social networks. Depending on the digital service, the digital content can include digital media assets; content assets that describe a product, a service, or an individual within a social network; and similar. A such, some of those digital services can utilize images to display box art for movies, television shows, and live events, and product information and advertising information (such as channel logotypes, puzzles and other types of challenges, etc.). The cardinality of these assets can be substantial and many of the assets can change over time. Thus, those assets are generally downloaded by a client application at runtime over a network.

One approach for a client application to obtain image assets for presentation on a webpage includes downloading each one of the image assets individually. For example, if 10 images would be displayed on the webpage, the client application can perform 10 network requests to download a single image per request. An alternative approach can be utilized in order to avoid several network requests. The alternative approach relies on "spriting" which is a technique used for some web-based applications where all image assets needed for presentation can be consolidated into a single image sprite. The client application can locally store the image sprite in a non-volatile memory device and can then render different portions of image sprite at a time.

A benefit of spriting is to reduce communication latency by reducing the number of network requests performed by the client application (or a client device executing the client application) to obtain the image assets for presentation in a webpage or another type of user interface. On the other hand, as a tradeoff, spriting can lead to increased utilization of main memory and processing at the client device—with reference to the example above, all 10 image assets are in main memory at a time and some processing can be performed to configure a suitable viewport. Accordingly, spriting is rarely (if ever) implemented in client devices where available memory and processing resources are rather limited.

Therefore, much remains to be improved in technologies for supplying image assets for presentation at a mobile device or similar client devices.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
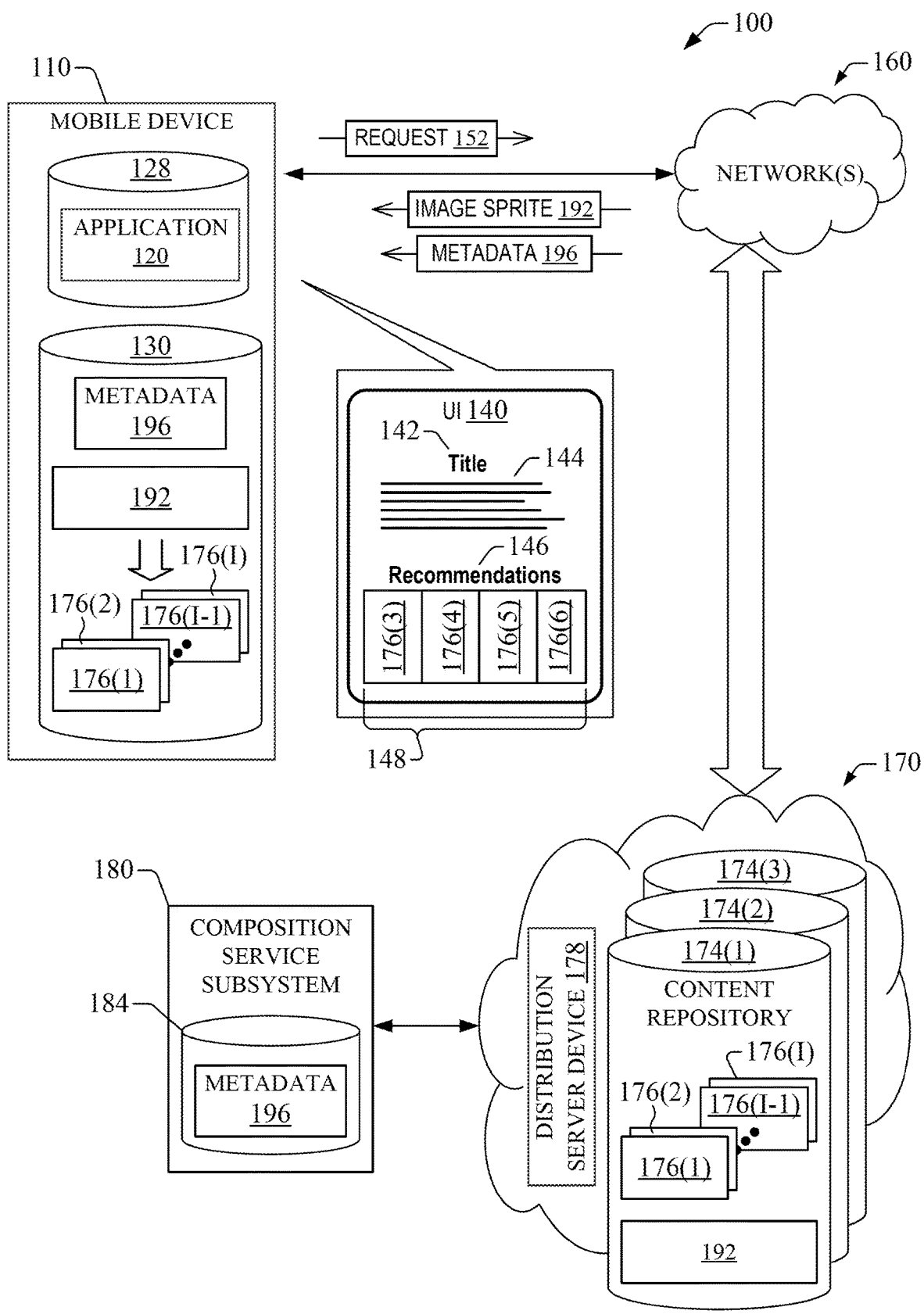
FIG. 1 illustrates an example of an operational environment for the supply of image assets for presentation by a mobile device, in accordance with one or more embodiments of this disclosure

The disclosure recognizes and addresses, among other technical challenges, the issue of supplying image assets for presentation on a webpage or another type of user interface at a computing device. Embodiments of this disclosure, individually or in combination, can efficiently supply image assets for display on a user interface at a mobile device. The mobile device can be embodied in, for example, a low-end smartphone; an electronic reader (e-reader) device; a handheld gaming console; a tablet computer; a wearable device, or similar computing device.

In some embodiments of the disclosed technologies, a group of images assets within an image sprite in response to a single request from the mobile device. The request can identify each image asset in the group of image assets. The mobile device can generate the request in response to initiating presentation of a user interface, based on image assets to be presented on the user interface. A network subsystem remotely located from the mobile device can compose the image sprite. The network subsystem also can generate metadata defining attributes of each one of the multiple image assets. The attributes of an image asset can include, for example, an identifier of the media asset, a title of digital media corresponding to the image asset, and placement of the image asset within the image sprite. In some embodiments, an attribute of the image asset can be a time-to-live parameter defining a time interval after which the image asset may no longer be an up-to-date. After such a time interval has elapsed, the image asset may be deleted. In some configurations, the network subsystem can provide the image sprite to a content distribution network (CDN). In such configurations, a server device within the CDN can then send the image sprite and the metadata to the mobile device.

The mobile device can decompose the image sprite into its constituent image assets, storing those image assets individually in a non-volatile storage device within the mobile device. The mobile device also can retain the metadata within the non-volatile storage device. When presenting a user interface, the mobile device can load one or several of the stored image assets into a system memory device rather than loading the entire image sprite into the system memory device. The system memory device can be embodied in a random-access memory (RAM) device within the mobile device. Thus, by obtaining image asset(s) pertinent to the user interface at runtime of a client application (a mobile application or a web browser, for example) and retaining in the non-volatile storage device other image assets unrelated to the rendering of the user interface, the mobile device can reduce demand on system memory. Accordingly, the mobile device can efficiently present the user interface even when having constrained system memory.

The image asset(s) that are loaded to the system memory device can be determined by formatting information defining the user interface. As such, the constituent image assets retained in the non-volatile storage device can be reused during the presentation of another user interface, without requesting those image assets again from, for example, the CDN. Because some of the image assets stored in the non-volatile memory device may be reused infrequently, the mobile device can apply retention rule(s) to remove those image asset(s) from the non-volatile storage device over time, for example.

Although embodiments of this disclosure are illustrated with reference to a mobile device, the disclosure is not limited in that respect. Indeed, the principles and practical applications of the disclosed technologies also can be applied in other types of client devices. Examples of a client device include a set-top box device and other types of streaming media-player devices.

Embodiments of this disclosure can reduce latency associated with obtaining image assets individually over a network. By obtaining the image assets in an image sprite, a single request for the image assets can be utilized rather than multiple requests for respective image assets. The image assets obtained by means of the sprite image can be individually retained in non-volatile memory for subsequent use. Metadata described the image assets individually also can be retained in the non-volatile storage device. Thus, the retained image assets can be readily identified and reused in multiple user interfaces. As such, a next request for an image sprite can be directed to image asset(s) unavailable in the non-volatile storage device, without requesting an extant image asset. Image asset(s) to be presented on a user interface can be loaded into volatile memory from the non-volatile storage device at runtime of an application that generates the user interface. As a result, the amount of non-volatile memory (e.g., system memory) utilized during presentation of the user interface can be reduced.

With reference to the drawings, FIG. 1 illustrates an example of an operational environment 100 for provision of image assets for presentation at a mobile device 110, in accordance with one or more embodiments of this technology. The mobile device 110 can execute a software application 120, such as a mobile application or a web browser, for an end user to consume digital content at the mobile device 110. By executing the application 120, the mobile device can load an executable image of the application 120 into a volatile memory 128 (e.g., system memory device, such as a RAM device) from a non-volatile storage device 130. As a result of executing the application 120, the mobile device 110 can initiate presentation of a user interface 140 (e.g., a landing webpage) corresponding to a digital service that provides the digital content. The service can be a content streaming service, for example. Presentation of the user interface 140 can include presentation of several image assets. Formatting information defining a layout of content of the user interface 140 can identify the image assets that are included in the user interface 140.

Figure 2:
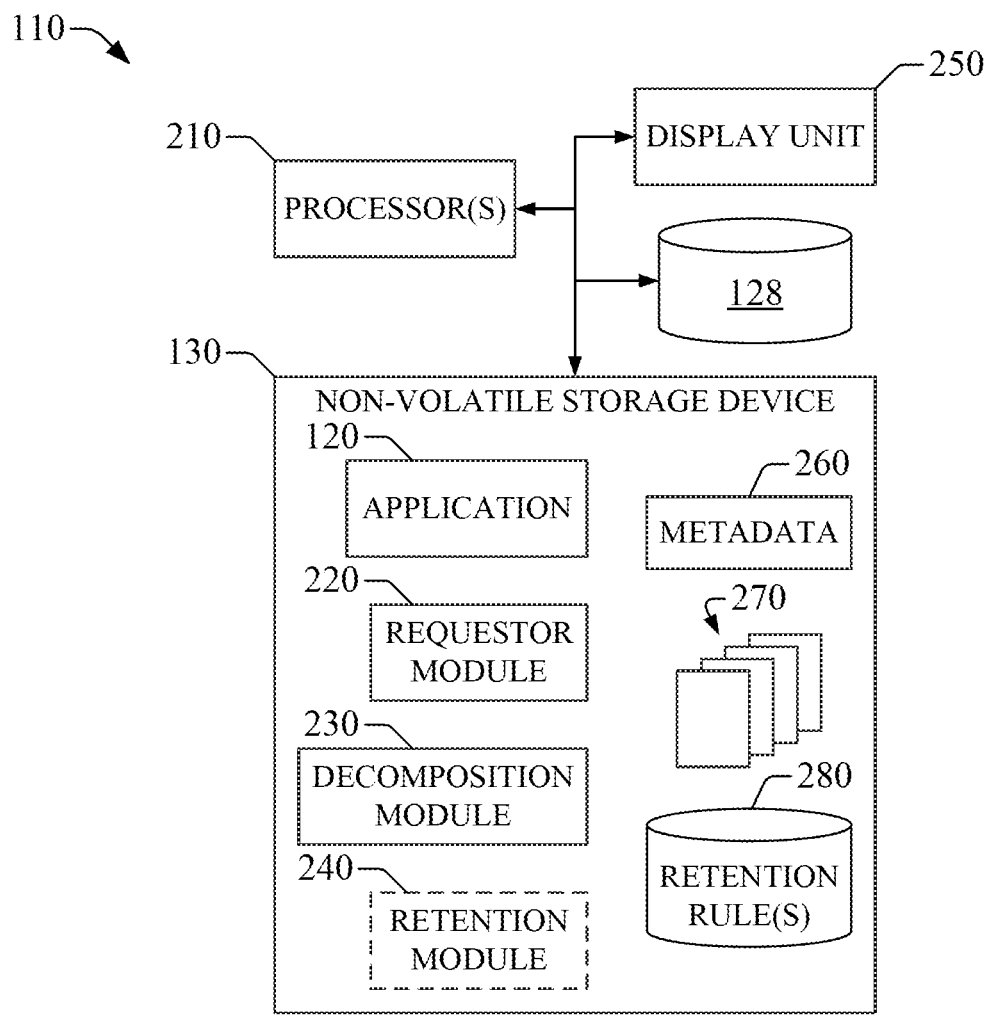
FIG. 2 illustrates an example of components of a mobile device in accordance with one or more embodiments of this disclosure.

The mobile device 110, using the formatting information, can then identify a subset of the image assets that is absent at the mobile device 110. To that end, in some embodiments, the mobile device 110 can search a filesystem present in a non-volatile memory device 130 for image assets(s) identified by the formatting information. In some situations, none of the image assets to be included in the user interface 140 are present at the mobile device 110. Thus, in those situations, the subset corresponds to all of the image assets to be included in the user interface 140. In other situations, some of the image assets are available to the mobile device 110 and, thus, a particular group of image assets remains to be obtained by the mobile device 110 as part of the presentation of the user interface 140. In some embodiments, as is illustrated in FIG. 2, the mobile device 110 can include a requestor module 220 that can determine if an image asset is available at the non-volatile storage device. To that end, one or many processor(s) 210 included in the mobile device 110 can execute the requestor module 220 as part of the execution of the application 120. While not shown, execution of the requestor module 220 can result in the requestor module 220 being loaded to the volatile memory device 128. Although the requestor module 220 is illustrated as being external to the application 120, the disclosure is not limited in that respect. In some configurations, the requestor module 220 can be integrated into the application 120.

Accordingly, the mobile device 110 can generate a request 152 for a group of image assets that is absent from a non-volatile storage device 130 and is to be included in the user interface 140. In addition, or in other embodiments, the group of image assets can include second image assets related to the user interface 140. For instance, the second image assets can correspond to one or several second user interfaces related to the user interface. In one example, the user interface 140 can pertain to an episode of a season of a television show, and the second user interface(s) can correspond to one or several other episodes in that season. The non-volatile storage device 130 can be embodied in a solid-state memory device, for example.

In some cases, the request 152 can be embodied in a uniform resource locator (URL). In other cases, the request 152 can be embodied in a hypertext transfer protocol (HTTP) request message. Both the URL and the HTTP request message can be formatted to identify the image assets. For instance, the URL can include a comma-separated listing of the image assets to be present in the image sprite. Simply as an illustration, the group of image assets can include a first image asset, a second image asset, a third image asset, and a fourth image asset. In one case, each one of the first, second, third, and fourth image assets can be a digital image formatted according to the Joint Photographic Experts Group (JPEG) standard and can be labeled ImageA.jpg, ImageB.jpg, ImageC.jpg, and ImageD.jpg, respectively. In such a case, the URL can be https://media.domainname.com/images/I/ImageA.jpg, ImageB.jpg, ImageC.jpg, and ImageD.jpg. Other image formats besides JPEG can be contemplated. In some embodiments, as is illustrated in FIG. 2, the mobile device 110 can include a requestor module 220 that can generate the request 152 in accordance with aspects described herein. Although the requestor module 220 is illustrated as being external to the application 120, the disclosure is not limited in that respect. In some configurations, the requestor module 220 can be integrated into the application 120.

With further reference to FIG. 1, the mobile device 110 can send the request 152 to a content source platform 170 that can provide various types of digital content assets, including image assets. The request 152 can be sent by means of one or more networks 160 (e.g., wireless network (s), wireline network(s), or a combination of both). The content source platform 170 can include multiple content repositories, including a first content repository 174(1), a second content repository 174(2), and a third content repository 174(3). The multiple content repositories can be distributed geographically. In some embodiments, the content source platform 170 can be embodied in, or can include, a CDN. In those embodiments, one or several first content repositories of the multiple content repositories can constitute an origin repository. The origin repository can include content generated by the provider of the content streaming service and/or another publisher. In addition, one or several second content repositories of the multiple repositories can constitute a cache repository. The cache repository can replicate at least some of the content retained in the origin repository.

The content source platform 170 can supply an image sprite 192 in response to the request 152. The image sprite 192 is a consolidated image asset that contains the image assets identified in the request 152. To that end, a server device that administers a content repository included in the content source platform 170 can relay the request 152 to a composition service subsystem 180. The composition service subsystem 180 can generate the image sprite 192 in response to the request 152. In some embodiments, the composition service subsystem 180 can generate the image sprite 192 by executing an application programming interface (API) function call in response to receiving the request 152. More specifically, execution of the function call can result in the composition service subsystem 180 obtaining the image assets identified in the request 152 from an origin repository (e.g., content repository 174(1)). After obtaining the image assets, the composition service subsystem 180 can then generate the image sprite 192. As an illustration, as mentioned, the request 152 can identify a set of multiple image assets **176(*i*), with i=1, 2, . . . , I-1, 1. The composition service subsystem 180 can receive data defining those assets from the content repository 174(1), for example, and can then generate the image sprite 192, which may be stored at content repository 174(I), as shown, or at another suitable location, such as at the composition service subsystem 180**.

The composition service subsystem 180 also can obtain metadata 196 in response to the request 152. The metadata 196 can define attributes of each one of the image assets identified in the request 152. In addition, or in other embodiments, the metadata 196 can define usability parameters for an image asset, where a first usability parameter can define a first portion of the image asset to be used in a user interface, and a second usability parameter can define a second portion of the image asset to be used in the user interface. For instance, the first portion can correspond to a bounding box containing a headshot of an athlete or a cast member of a feature film. In addition, the second portion can correspond to a bounding box containing whole body of athlete or the cast member. Formatting information corresponding to the user interface 140 can determine that the first portion or the second portion is used. Further, or in yet other embodiments, the metadata 196 can define processability parameters for an image asset, where each one of the processability parameters can identify a respective operation (e.g., crop image, apply greyscale, etc.) that can be applied to the image asset before or during presentation of a user interface. In one configuration, the composition service subsystem 180 can send a query message to the origin repository for attributes of an image asset identified in the request 152. In response to the query message, a server device that administers the origin repository can send the metadata 196 to the composition service subsystem 180.

The composition service subsystem 180 can retain the metadata 196 in one or more memory devices 184 and can retain the image sprite 192 in the origin repository of the content source platform 170. As mentioned, the image sprite 196 and the metadata 196 can be sent to the mobile device 110 by means of one or more of the networks 160. As is illustrated in FIG. 1, a distribution server device 178 can send the image sprite 196 or the metadata 196, or both. In some configurations, the image sprite 196 and the metadata 196 can be sent in separate transmissions from the content source platform 170 to the mobile device 110. In other configurations, both the image sprite 192 and the metadata 196 can be sent in a single transmission from the content source platform 170 to the mobile device 110. It is noted that this disclosure is not limited to the composition service subsystem 180 being separate from the content source platform 170. In some embodiments, the composition service subsystem 180 can be integrated into the content source platform 170.

The mobile device 110 can receive the image sprite 192 and the metadata 196. The mobile device 110 can then extract the image assets that constitute the image sprite 192. Extracting a particular image asset from the image sprite 192 can include identifying, using the metadata 196, the particular image asset and storing the particular image asset in the non-volatile storage device 130. To store the particular image asset, the mobile device 110 can generate a file containing the particular image asset in a filesystem within the non-volatile storage device 130. The file can be formatted according to one of several digital image formats. In some configuration, the file can be indexed within the filesystem. The extraction of the constituent image assets is represented with an open arrow within the non-volatile storage device 130. After such an extraction, the mobile device 110 can delete the image sprite 192.

The mobile device 110 also can retain the metadata 196 in the non-volatile storage device 130. In some embodiments, as is illustrated in FIG. 2, the mobile device 110 can include a decomposition module 230 that can extract the image assets that constitute an image sprite, in accordance with aspects described herein. To that end, the processor(s) 210 included in the mobile device 110 can execute the decomposition module 230 as part of the execution of the application 120, for example. While not shown, execution of the decomposition module 230 can result in the composition module 230 being loaded to the volatile memory device 128. Although the decomposition module 230 is illustrated as being external to the application 120, the disclosure is not limited in that respect. In some configurations, the requestor module 220 can be integrated into the application 120. The non-volatile memory device 130 can retain image assets 270 and corresponding metadata 260 extracted in response to various requests for image sprites over time.

The mobile device 110 can present at least one of the extracted image assets 176(1) to 176(I) as part of the presentation of the user interface 140. The mobile device 110 can present the image assets by means of the display device (not depicted in FIG. 1) that presents the user interface. The display device can be a part of a display unit 250 (FIG. 2). In some embodiments, the display device can include a liquid crystal display (LCD) or a light-emitting diode (LED) display. The display device can be either backlit or frontlit. The display unit 250 also can include an output interface module (not depicted in FIG. 2) that can control the operation of the LCD or the LED display and associated lighting circuitry in order to present user interfaces.

The image assets 176(1) to 176(I) can be presented according to a defined layout of digital content, where the defined layout is specific to the user interface 140. Formatting information (not depicted in FIG. 1) corresponding to the user interface can define the layout. As an illustration, the layout of the user interface 140 can include a title 142 identifying content, such as a show having several episodes per season, and accompanying text, such as text describing a particular season of the show (for example, a season selected by an end-user of the mobile device 110). In addition, such a layout can include a second section title 146 identifying, for example, recommendations for other content (e.g., shows), and a carousel 148. The carousel 148 can have a defined viewport within the user interface 140 where some of the image assets 176(*i*) can be presented, entirely or partially. As is illustrated in FIG. 1, in a scenario in which I is greater than six, the image asset 176(3), image asset 176(4), and image asset 176(5) can be displayed entirely in the carousel 148. The image asset 176(6) can be presented partially in the carousel 148.

Presenting the image assets can include loading the image assets into the volatile memory device 128. Presenting the image assets can further include causing the display device to display a first image asset of the image assets in a first section of the defined layout and a second image asset of the image assets in a second section of the defined layout.

Figure 3:
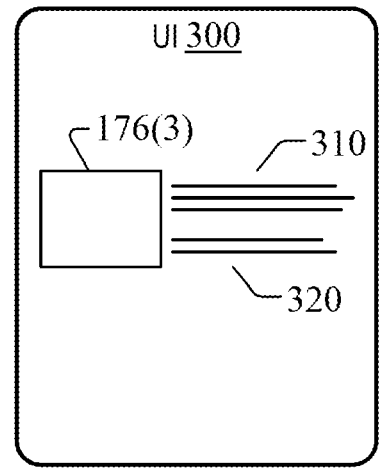
FIG. 3 illustrates an example of a user interface that can be presented in a mobile device, in accordance with one or more embodiments of this disclosure.

When presenting the user interface 140, the mobile device 110 can load one or several of the retained images assets into the volatile memory device 128 (e.g., a main memory device of the mobile device 110 rather than uploading the entire image sprite 196. As mentioned, the image asset (s) that are loaded can be determined by formatting information defining the user interface 140. Thus, one or many image assets extracted from an image sprite and retained in the non-volatile storage device 130 can be reused during presentation of other user interfaces, without requesting such image asset(s) again from the content source platform 170. As an illustration, after presentation of the user interface 140, the mobile device 110 can initiate presentation of the user interface 300 shown in FIG. 3. The mobile device can determine that the user interface 300 includes the image asset 176(3) and that such an image asset is available in the mass storage device 130. Accordingly, rather than generating a request for the image asset 176(3), the mobile device 110 can load the image asset 176(3) into a volatile memory device (e.g., a main memory device, such as a RAM device) and then present the image asset 176(3) within the user interface 300. As is shown in FIG. 3, the layout of the user interface 300 can include a first area for the image asset 176(3). The layout also can include a second area for textual elements 310, for example, providing first information about digital media corresponding to the image asset 176(3). The layout can further include a third area for textual elements 320, for example, providing second information associated with the digital media. As an illustration, the digital media can embody an episode of a show series, the first information can include a synopsis of the episode, and the second information can identify a cast of the episode.

Because extracted image assets may be reused at different rates—e.g., an image asset may be reused infrequently and another image asset may be utilized frequently—the mobile device 110 can apply one or several retention rules to images assets in the mass storage device 130. A retention rule can establish period for retaining an image asset in the mass storage device 130. An example retention rule can dictate that an image asset can be deleted after a particular time interval (for example, one day, one week, etc.) since extraction has elapsed. Another example retention rule can dictate that the top-few most frequently utilized image assets over a particular period (e.g., a week) can be retained while some or all of the less frequently utilized image assets can be deleted. Yet another example retention rule can dictate that an image asset is deleted or removed after a particular time interval of non-use. For instance, such an image asset can be deleted from the non-volatile storage device 130 after the particular time interval has elapsed since the image asset was last presented in a user interface. In some embodiments, again with reference to FIG. 2, the mobile device 110 can include a retention module 240 that can apply one or many retention rules to the image assets retained in the mass storage device 130. To that end, the processor(s) 210 can execute the retention module 240 as part of the execution of the application 120, for example. While not shown, execution of the retention module 240 can result in the retention module 240 being loaded to the volatile memory device 128. Although the retention module 240 is illustrated as being external to the application 120, the disclosure is not limited in that respect. In some configurations, the requestor module 220 can be integrated into the application 120. In response to the application of the retention rule(s), the retention module 240 can remove at least one image asset retained in the mass storage device 130. A retention rule can be stored in one or more memory elements 280 (referred to as retention rule(s) 280) within the non-volatile storage device 130.

Figure 4:
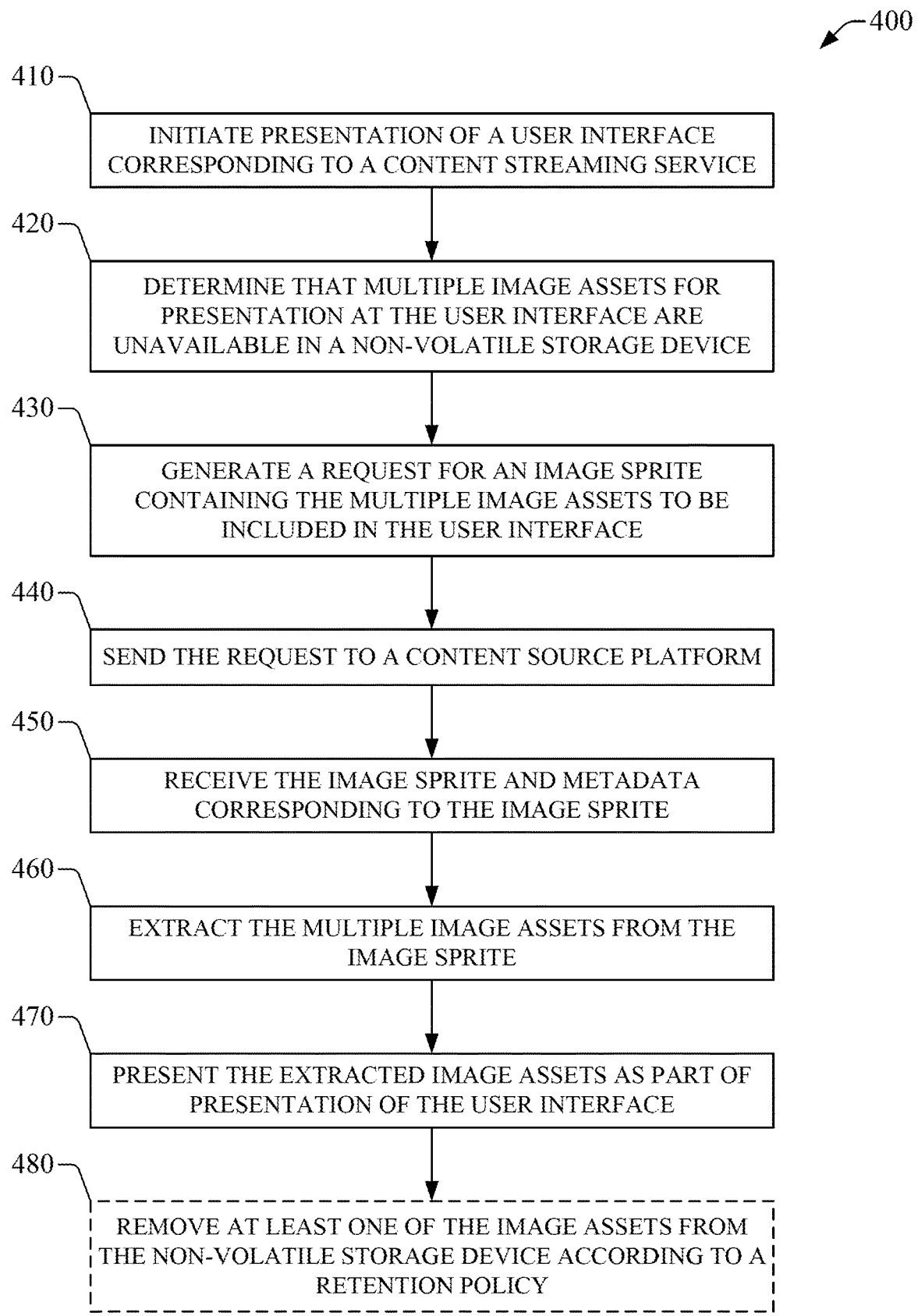
FIG. 4 illustrates of an example of a method for supplying image assets for presentation by a mobile device, in accordance with one or more embodiments of this disclosure.
Figure 5:
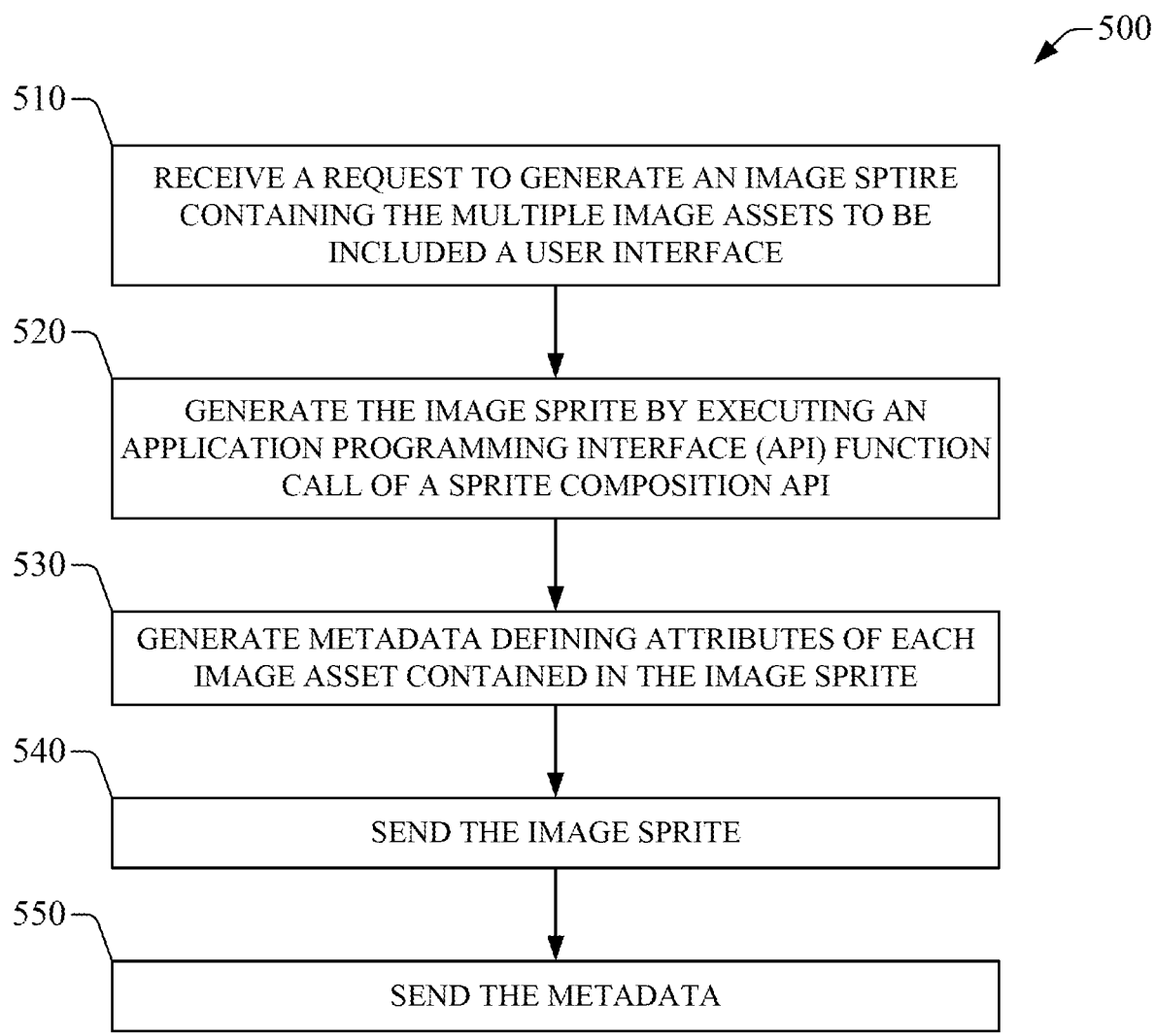
FIG. 5 illustrates of an example of a method for generating an image sprite, in accordance with one or more embodiments of this disclosure.

In view of the aspects of the techniques disclosed herein, an example method that can be implemented in accordance with this disclosure can be more readily appreciated with reference to the flowcharts in FIG. 4 and FIG. 5. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

The methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 4 illustrates an example of a method 400 for providing image assets for presentation at a computing device, in accordance with one or more embodiment of this disclosure. The computing device can be embodied in a mobile device (e.g., mobile device 110) or another type of client device, for example. The computing device can implement, entirely or partially, the example method 400. To that end, the computing device has various computing resources. More specifically, the computing device has at least one processor and/or is functionally coupled to at least one processor that can implement (e.g., compile, execute, compile and execute, etc.) one or more blocks of the example method 400. The computing device also can include one or many memory devices, other types of computing resources, or a combination thereof. Such processor(s), memory device(s), and computing resource(s), individually or in a particular combination, can permit the computing device to implement the example method 400, entirely or partially. The computing resources can include, for example, a firmware, an operating system; software or other program code; CPU(s) or other types of processing devices; interface(s) (I/O interface devices, programming interface(s) (such as APIs, etc.); a controller devices; a combination of the foregoing; or similar. The computing resources available to the computing device also can include downstream communication bandwidth and/or upstream communication bandwidth.

At block 410, the computing device can initiate presentation of a user interface corresponding to a web-based service for consumption of digital content (e.g., a content streaming service). To that end, in one example, the computing device can execute a software application (such as a mobile application) corresponding to the content streaming service. In another example, the computing device can execute (or can continue executing) a web browser and can request a webpage from server device corresponding to the content. In that example, the webpage can embody the user interface.

At block 420, the computing device can determine that multiple image assets for presentation at the user interface are unavailable in a non-volatile storage device (e.g., storage device 130 (FIG. 1)). As mentioned, the non-volatile storage device can be integrated into the computing device. The computing device can include a software module (e.g., the requestor module 220 (FIG. 2), that can determine availability of an image asset within the non-volatile storage device. In addition, or in other embodiments, the computing device can determine that second image assets related to the user interface also are unavailable. The second image assets can correspond to one or several second user interfaces related to the user interface. For instance, the user interface can pertain to an episode of a season of a television show, and the second user interface(s) can correspond to one or several other episodes in that season.

At block 430, the computing device can generate a request for an image sprite containing the multiple image assets to be included in the user interface. The request can be embodied in a uniform resource locator (URL), for example. The request also can be embodied in a hypertext transfer protocol (HTTP) request message, in some cases. Both the URL and the HTTP request message can be formatted to identify the image assets. For instance, the URL can include a comma-separated listing of the image assets to be present in the image sprite. An example of such a URL is: https://media.domainname.com/images/I/ImageA.jpg,ImageB.jpg,ImageC.jpg,ImageD.jpg,ImageE.jpg. The computing device can include a software module (e.g., the requestor module 220 (FIG. 2), that can generate the request. In embodiments in which the computing device identifies unavailable second image assets related to the multiple image assets, the request also can identify the second image assets. Thus, the request generated in response to initiation of presentation of the user interface can identify many image assets corresponding to the user interface and related user interfaces that may be presented at other time.

At block 440, the computing device can send the request to a content source platform (e.g., platform 170 (FIG. 1)) remotely located relative to the computing device. In some cases, the content source platform can be embodied in a CDN. The content source platform can direct a composition service subsystem (e.g., subsystem 180 (FIG. 1)) to generate the image sprite in response to the request. In one embodiment, the content source platform can include a distribution server device, such as an edge server, that can direct the composition service subsystem to generate the image sprite.

At block 450, the computing device can receive the image sprite and metadata corresponding to the image sprite. The image sprite can be received from a server device within the content source platform. In one embodiment, content source platform can be embodied in the platform 170 (FIG. 1) and the server device can be embodied in the distribution server device 178. As mentioned, the content source platform can be embodied in, or can include, a CDN.

At block 460, the computing device can extract the image assets and corresponding metadata from the image sprite. Extracting a particular image asset and associated metadata from the image sprite can include identifying, using the metadata, the particular image asset. In addition, extracting the particular image asset can include storing both the particular image asset and the associated metadata in the non-volatile storage device. Storing the particular image asset can include generating a file containing the particular image asset in a file system within the non-volatile storage device, and indexing the file. After the image assets have been extracted from the received sprite image, those assets can remain in the non-volatile storage device and can be reused during presentation of other user interfaces. In some embodiments, the computing device can include a software module (e.g., the decomposition module 230 (FIG. 2), that can generate the request. In embodiments in which the image sprite contains the multiple image assets corresponding to the user interface and second image assets corresponding to one or more other user interfaces related to the user interface, the computing device can extract both the multiple image assets and the second image assets.

At block 470, the computing device can present the extracted image assets during presentation of the user interface. The computing device can present the image assets by means of the display device presenting the user interface. The image assets can be presented according to a defined layout of digital content, where the defined layout is specific to the user interface. Formatting information corresponding to the user interface can define the layout. Accordingly, presenting the image assets can include, for example, determining that the defined layout is configured to include the extracted images assets. Presenting the image assets can include loading the image assets into a volatile memory device (e.g., a RAM device) within the computing device. Presenting the image assets can further include causing the display device to display a first image asset of the image assets in a first section of the defined layout and a second image asset of the image assets in a second section of the defined layout. The software application or web-browser that initiates presentation of the user interface can load the image assets into the volatile memory device. In embodiments in which the image sprite contains the multiple image assets corresponding to the user interface and second image assets corresponding to one or more other user interfaces related to the user interface, the computing device can present the multiple image assets, without presenting the second image assets. Thus, the computing device can present a subset of the image assets extracted at block 460.

In some embodiments, the example method 400 can optionally include block 480, where the computing system can remove at least one of the image assets from the non-volatile storage device according to a retention policy.

FIG. 5 illustrates an example of a method 500 for generating a sprite image, in accordance with one or more embodiment of this disclosure. The example method 500 can be implemented, entirely or partially, by a computing system having various computing resources. The computing system can include, for example, the composition service subsystem 180 and the distribution server device 178. The computing system has at least one processor and/or is functionally coupled to at least one processor that can implement one or more blocks of the example method 600. The computing system also can include one or many memory devices, other types of computing resources, or a combination thereof. Such processor(s), memory device(s), and computing resource(s), individually or in a particular combination, can permit the computing system to implement the example method 600, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 600 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can include memory device(s) and/or other computing resources. Regardless of the example method 600 being implemented by a distributed or non-distributed computing system, the at least one processor can be functionally coupled to at least one memory device or other types of computer-readable non-transitory storage media.

A block 510, the computing system can receive a request to generate an image sprite containing multiple image assets to be included in a user interface. The user interface can correspond to a digital service that provides digital content for consumption by an end-user. The digital service be embodied in, for example, a content streaming service or a digital marketplace. The computing system can include a computing device (e.g., the distribution server device 178 (FIG. 1)) that can receive the request from a mobile device, by means of one or more networks.

At block 520, the computing system can generate the image sprite by executing an application programming interface (API) function call of a sprite composition API. To that end, in some embodiments, the computing device that receive the request can direct a computing subsystem (composition service subsystem 180 (FIG. 1)) of the computing system to generate the image sprite. In response to computing subsystem can execute the API function call At block 530, the computing system 530 can generate metadata defining attributes of each one of the image assets contained in the image sprite. The metadata can include first data defining an identifier for a first image asset of the image assets, second data defining a title of digital media corresponding to the image asset, and third data defining placement of the image asset within the image sprite. In some embodiments, the metadata also can include data defining a time-to-live parameter that defines a time interval after which the image asset may no longer be up-to-date. In addition, or in other embodiments, the metadata can define usability parameters for an image asset, where a first usability parameter can define a first portion of the image asset to be used in a user interface, and a second usability parameter can define a second portion of the image asset to be used in the user interface. Further, or in yet other embodiments, the metadata can define processability parameters for an image asset, where each one of the processability parameters can identify a respective operation (e.g., crop image, apply greyscale, etc.) that can be applied to the image asset before or during presentation of a user interface.

At block 540 the computing system can send the image sprite. To that end, in some embodiments, the computing subsystem that generates the image sprite can store the image sprite in a content repository functionally coupled to the computing device that received the request to generate the image sprite. After the image sprite is stored in the content repository, such a computing device can send the image sprite to a mobile device by means of one or more networks. At block 550, the computing system can send the metadata. To that end, in some embodiments, the computing subsystem that generated the metadata can send the metadata to the computing device that received the received the request for the image sprite. The computing device can relay the metadata to a mobile device by means of one or many networks.

While the image sprite and the metadata are illustrated as being sent separately, the disclosure is not limited in that respect. In some embodiments, the computing system can send both the image sprite and the metadata in a single transmission to the mobile device.

Figure 6:
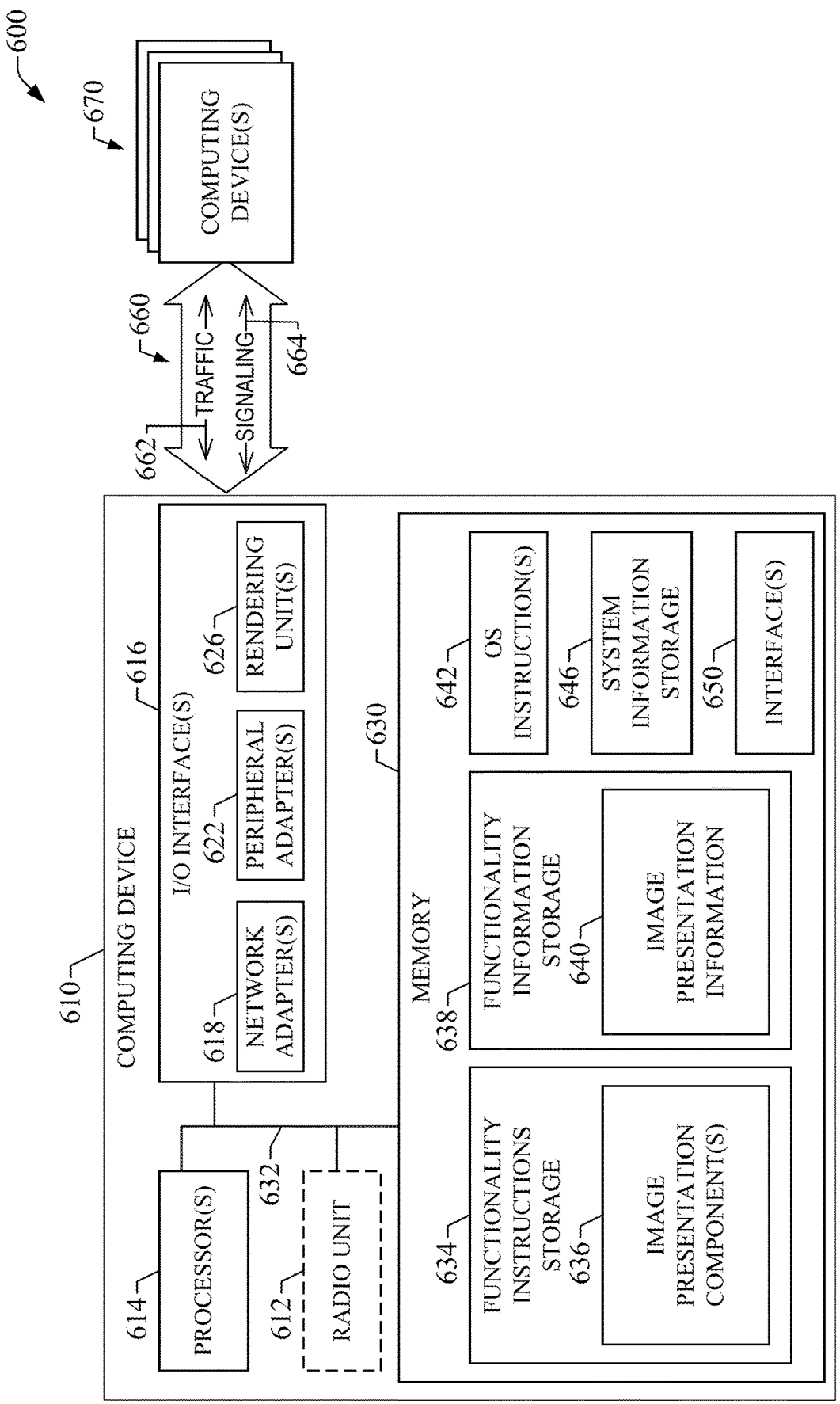
FIG. 6 illustrates an example of a computational environment for the supply of image assets for presentation by a mobile device, in accordance with one or more embodiments of the disclosure.

FIG. 6 is a block diagram of an example computational environment 600 for the supply of image assets for presentation by a mobile device, in accordance with one or more aspects of the disclosure. The example computational environment 600 is merely illustrative and is not intended to suggest or otherwise convey any limitation as to the scope of use or functionality of the computational environment's architecture. In addition, the illustrative computational environment depicted in FIG. 6 should not be interpreted as having any dependency or requirement relating to any one or combination of components illustrated in the example operational environments of the disclosure. The example computational environment 600 or portions thereof can embody, or can include, for example, the operational environment 100.

The computational environment 600 represents an example implementation of the various aspects or elements of the disclosure in which the processing or execution of operations described in connection with the presentation of user interfaces including images can be performed in response to execution of one or many software components at the computing device 610. It should be appreciated that the one or many software components can render the computing device 610, or any other computing device that contains such components, a particular machine for generation of points of insertion of directed content into a video asset as is described herein, among other functional purposes. A software component can be embodied in or can include one or many computer-accessible instructions, e.g., computer-readable and/or computer-executable instructions. In one scenario, at least a portion of the computer-accessible instructions can embody and/or can be executed to perform at least a part of one or several of the example methods disclosed herein, such as the example methods presented in FIG. 4 and FIG. 5.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 610 or other computing devices. Generally, such program modules include computer code, routines, programs, objects, components, information structures (e.g., data structures and/or metadata structures), etc., that can perform particular tasks (e.g., one or more operations) in response to execution by one or more processors, which can be integrated into the computing device 610 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with presentation of user interfaces including images according to aspects described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 610 can include one or more processors 614, one or more input/output (I/O) interfaces 616, a memory 630, and a bus architecture 632 (also termed bus 632) that functionally couples various functional elements of the computing device 610. In certain embodiments, the computing device 610 can include, optionally, a radio unit 612. The radio unit 612 can include one or more antennas and a communication processing unit that can permit wireless communication between the computing device 610 and another device, such as one of the computing device(s) 670. The bus 632 can include at least one of a system bus, a memory bus, an address bus, or a message bus, and can permit exchange of information (data, metadata, and/or signaling) between the processor(s) 614, the I/O interface(s) 616, and/or the memory 630, or respective functional elements therein. In certain scenarios, the bus 632 in conjunction with one or more internal programming interfaces 650 (also referred to as interface(s) 650) can permit such exchange of information. In scenarios in which processor(s) 614 include multiple processors, the computing device 610 can utilize parallel computing.

The I/O interface(s) 616 can permit communication of information between the computing device and an external device, such as another computing device, e.g., a network element or an end-user device. Such communication can include direct communication or indirect communication, such as exchange of information between the computing device 610 and the external device via a network or elements thereof. As illustrated, the I/O interface(s) 616 can include one or many of network adapter(s) 618, peripheral adapter(s) 622, and rendering unit(s) 626. Such adapter(s) can permit or facilitate connectivity between the external device and one or more of the processor(s) 614 or the memory 630. For example, the peripheral adapter(s) 622 can include a group of ports, which can include at least one of parallel ports, serial ports, Ethernet ports, V.35 ports, or X.21 ports. In certain embodiments, the parallel ports can include General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 618 can functionally couple the computing device 610 to one or many computing devices 670 via one or more traffic and signaling pipes 660 that can permit or facilitate exchange of traffic 662 and signaling 664 between the computing device 610 and the one or many computing devices 670. Such network coupling provided at least in part by the at least one of the network adapter(s) 618 can be implemented in a wired environment, a wireless environment, or both. The information that is communicated by the at least one of the network adapter(s) 618 can result from the implementation of one or more operations of a method in accordance with aspects of this disclosure. Such output can be any form of visual representation, including, but not limited to, textual, graphical, animation, audio, tactile, and the like. In certain scenarios, each one of the computing device(s) 670 can have substantially the same architecture as the computing device 610. In addition, or in the alternative, the display unit(s) 626 can include functional elements that can permit control of the operation of the computing device 610, or can permit revealing the operational conditions of the computing device 610. Such functional elements can include, for example, lighting devices, such as light-emitting diodes; a display device, such as a liquid crystal display (LCD), a plasma monitor, a light emitting diode (LED) monitor, or an electrochromic monitor; combinations thereof; or similar elements.

In one aspect, the bus 632 represents one or many of several types of bus structures, including a memory bus or a memory controller, a peripheral bus, an accelerated graphics port, and a processor or local bus using any of various bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 632, and all buses described herein can be implemented over a wired or wireless network connection and each of the subsystems, including the processor(s) 614, the memory 630 and memory elements therein, and the I/O interface(s) 616 can be contained within one or more remote computing devices 670 at physically separate locations, connected through buses of this form, in effect implementing a fully distributed system. In certain embodiments, such a distributed system can implement the functionality described herein in a client-host or client-server configuration in which the image presentation component(s) 636 or the impression reporting information 640, or both, can be distributed between the computing device 610 and at least one of the computing device(s) 670, and the computing device 610 and at least one of the computing device(s) 670 can execute such components and/or leverage such information.

The computing device 610 can include a variety of computer-readable media. Computer-readable media can be any available media (transitory and non-transitory) that can be accessed by a computing device. In one aspect, computer-readable media can include computer non-transitory storage media (or computer-readable non-transitory storage media) and communications media. As such, computer-readable non-transitory storage media can be any available media that can be accessed by the computing device 610, and can include, for example, both volatile and non-volatile media, and removable and/or non-removable media. In one aspect, the memory 630 can include computer-readable media in the form of volatile memory, such as random access memory (RAM), and/or non-volatile memory, such as read-only memory (ROM).

As is illustrated in FIG. 6, the memory 630 can include functionality instructions storage 634 and functionality information storage 638. The functionality instructions storage 634 can include computer-accessible instructions that, in response to execution (by at least one of the processor(s) 614), can implement one or more of the functionalities of the technologies disclosed herein. The computer-accessible instructions can embody, or can include, one or many software components illustrated as image presentation component(s) 636. In one scenario, execution of at least one component of the image presentation component(s) 636 can implement one or several of the methods described herein, such as the example method 400. For instance, such execution can cause a processor (e.g., one of the processor(s) 614) that executes the at least one component to carry out one or a combination of the disclosed techniques (including the example method 400 and the example method 500). It is noted that, in one aspect, a processor of the processor(s) 614 that executes at least one of the image presentation component(s) 636 can retrieve information from or retain information within one or many memory elements 640 in the functionality information storage 638 in order to operate in accordance with the functionality programmed or otherwise configured by the image presentation component(s) 636. The one or many memory elements 640 may be referred to as image presentation information 640. Such information can include at least one of code instructions, information structures, or the like.

In some embodiments, one or many components of the image presentation component(s) 636 can embody, or can be part of, at least one of the application 120, the requestor module 220, the decomposition module 230, or the retention module 240. As such, the one or many components can operate in accordance with, and can provide the functionality of, application 120, the requestor module 220, the decomposition module 230, and the retention module 240. In other embodiments, one or many of the image presentation component(s) 636 in combination with at least one of the processor(s) 614 can embody or can constitute at least one of application 120, the requestor module 220, the decomposition module 230, or the retention module 240, and can operate in accordance with, and can provide the functionality of, such units in accordance with aspects described in this disclosure.

At least one of the one or more interfaces 650 (e.g., application programming interface(s)) can permit or otherwise facilitate communication of information between two or more components within the functionality instructions storage 634. The information that is communicated by the at least one interface can result from implementation of one or many operations in a method of this disclosure. In some embodiments, the functionality instructions storage 634 or the functionality information storage 638, or both, can be embodied in or can include removable/non-removable, and/or volatile/non-volatile computer storage media.

At least a portion of at least one of the image presentation component(s) 636 or item acquisition information 640 can program or otherwise configure one or many of the processors 614 to operate at least in accordance with the functionality described herein. One or many of the processor(s) 614 can execute at least one of the image presentation component(s) 636 and utilize at least a portion of the information in the functionality information storage 638 in order to generate points of insertion of directed content into a video asset in accordance with one or more aspects described herein.

It should be appreciated that, in some scenarios, the functionality instruction(s) storage 634 can embody, or can include, a computer-readable non-transitory storage medium having computer-accessible instructions that, in response to execution, cause at least one processor (e.g., one or several of the processor(s) 614) to perform a group of operations including the operations or blocks described in connection with the disclosed methods.

In addition, the memory 630 can include computer-accessible instructions and information (e.g., data, metadata, and/or programming code instructions) that permit or facilitate the operation and/or administration (e.g., upgrades, software installation, any other configuration, or the like) of the computing device 610. Accordingly, as illustrated, the memory 630 can include a memory element 642 (labeled operating system (OS) instruction(s) 642) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 610 can dictate a suitable OS. The memory 630 also includes system information storage 646 having data, metadata, and/or programming code that permits or facilitates the operation and/or administration of the computing device 610. Elements of the OS instruction(s) 642 and the system information storage 646 can be accessible or can be operated on by at least one of the processor(s) 614.

It should be recognized that while the functionality instructions storage 634 and other executable program components, such as the OS instruction(s) 642, are illustrated herein as discrete blocks, such software components can reside at various times in different memory components of the computing device 610, and can be executed by at least one of the processor(s) 614. In certain scenarios, an implementation of the image presentation component(s) 636 can be retained on or transmitted across some form of computer-readable media.

The computing device 610 and/or one of the computing device(s) 670 can include a power supply (not shown), which can power up components or functional elements within such devices. The power supply can be a rechargeable power supply, e.g., a rechargeable battery, and can include one or more transformers to achieve a power level suitable for the operation of the computing device 610 and/or one of the computing device(s) 670, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 618) to connect operationally to the conventional power grid. In another aspect, the power supply can include an energy conversion component, such as a solar panel, to provide additional or alternative power resources or autonomy for the computing device 610 and/or one of the computing device(s) 670.

The computing device 610 can operate in a networked environment by utilizing connections to one or many remote computing devices 670. As an illustration, a remote computing device can be a personal computer, a portable computer, a server, a router, a network computer, a peer device or other common network node, or similar. As is described herein, connections (physical and/or logical) between the computing device 610 and a computing device of the one or many remote computing devices 670 can be made via one or more traffic and signaling pipes 660, which can include wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 670) that are functionally coupled (e.g., communicatively linked or otherwise coupled) through a network having traffic and signaling pipes and related network elements. In a distributed computing environment, in one aspect, one or more software components (such as program modules) can be located in both a local computing device 610 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," and "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can include solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DR-RAM). The disclosed memory components or memories of operational environments described herein are intended to include one or many of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for supplying image assets for presentation by a mobile device or another type of client device. It is, of course, not possible to describe every conceivable combination of elements and/or method for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:

initiating, by a mobile device comprising one or more processors, presentation of a webpage to consume digital content from a content streaming service;

identifying, by the mobile device, using formatting information corresponding to the webpage, multiple image assets to be included in the webpage, the formatting information defining a layout of visual elements within the webpage, wherein a first visual element of the visual elements corresponds to a first image asset of the multiple image assets and a second visual element of the visual elements corresponds to a second image asset of the multiple image assets;

determining, by the mobile device, that the multiple image assets are unavailable within a non-volatile storage device integrated into the mobile device;

generating, by the mobile device, a uniform resource locator (URL) defining a request for an image sprite containing the multiple image assets;

sending, by the mobile device, the URL to a content distribution network;

receiving, by the mobile device, from the content distribution network, the image sprite and metadata corresponding to the image sprite, the metadata including first data defining an identifier for a particular image asset of the multiple image assets and second data defining a movie title corresponding to the particular image asset;

storing, by the mobile device, the metadata in the non-volatile storage device;

extracting, by the mobile device, the multiple image assets from the image sprite, the extracting including,
identifying, using the metadata, the particular image asset within the image sprite;
storing the particular image asset in the non-volatile storage device; and presenting, by the mobile device, the multiple assets during presentation of the webpage, the presenting including,
loading the particular image asset into a random-access memory (RAM) device integrated into the mobile device; and causing a display device integrated into the mobile device to present the particular image asset in a defined section of the layout.

2. The method of claim 1, further comprising, determining, by the mobile device, that the particular image asset satisfies a retention rule defining a condition to preserve an image asset in the mobile device;

retaining, by the mobile device, the particular image asset in the non-volatile storage device;

determining that a subset of the multiple image assets fails to satisfy the retention rule; and deleting the subset of the multiple image assets from the non-volatile storage device.

3. The method of claim 1, further comprising, initiating, by the mobile device, presentation of a second webpage to consume digital content from the content streaming service;

identifying, by the mobile device, using second formatting information corresponding to the second webpage, a third image asset to be included in the second webpage, the second formatting information defining a second layout of visual elements within the second webpage;

determining, by the mobile device, that the third image asset is available in the non-volatile storage device; and causing the display device to present the third image asset in a defined section of the second layout.

4. The method of claim 1, further comprising, initiating, by the mobile device, presentation of a second webpage to consume digital content from the content streaming service;

identifying, by the mobile device, using second formatting information corresponding to the second webpage, second multiple image assets to be included in the second webpage, wherein the second multiple image assets include the first image asset, the second image asset, and a group of third image assets;

determining, by the mobile device, that the group of third image assets is unavailable within the non-volatile storage device;

generating, by the mobile device, a second URL defining a request for a second image sprite containing the group of third image assets.

5. A method, comprising:

generating, by a computing device comprising one or more processors, a request for an image sprite containing multiple image assets to be presented in at least one user interface, wherein the request identifies multiple image assets;

sending, by the computing device, the request to a content source platform;

receiving, by the computing device, from the content source platform, the image sprite and metadata corresponding to the image sprite;

storing, by the computing device, the metadata in the non-volatile storage device;

extracting, by the computing device, using the metadata, the multiple image assets from the image sprite, the extracting including storing the multiple image assets in the non-volatile storage device; and presenting, by the computing device, a subset of the multiple assets during presentation of a first user interface of the at least one user interface.

6. The method of claim 5, wherein the first user interface has a first layout section, and wherein the presenting comprises, causing presentation of a first image asset of the multiple image assets in the first section of the first user interface based using the metadata.

7. The method of claim 5, further comprising, determining, by the computing device, that a first image asset of the multiple image assets satisfies a retention rule;

retaining, by the computing device, the first image asset in the non-volatile storage device;

determining that a subset of the multiple image assets fails to satisfy the retention rule; and deleting the subset of the multiple image assets from the non-volatile storage device.

8. The method of claim 5, wherein the request comprises one of a uniform resource locator (URL) comprising a listing of the multiple image assets.

9. The method of claim 5, wherein the metadata includes first data defining a first attribute of a first image asset of the multiple image assets and second data defining a second attribute of the first image asset, and wherein the extracting comprises, identifying, using the metadata, the first image asset within the image sprite; and storing the first image asset in the non-volatile storage device.

10. The method of claim 9, wherein the storing comprises, generating a file containing the particular image asset in a filesystem within the non-volatile storage device; and indexing the file.

11. The method of claim 5, further comprising, initiating, by the computing device, presentation of a second user interface having a defined layout of sections corresponding to respective visual elements;

identifying, by the computing device, a first image asset to be included in the second user interface;

determining, by the computing device, that the first image asset is in the non-volatile storage device; and causing the display device to present the first image asset in a first section of the defined layout.

12. The method of claim 5, further comprising, initiating, by the computing device, presentation of a second user interface;

identifying, by the computing device, second multiple image assets to be included in the second user interface, wherein the second multiple image assets include a first image asset of the multiple image assets, a second image asset of the multiple image assets, and a group of third image assets;

determining, by the computing device, that the group of third image assets is unavailable within the non-volatile storage device;

generating, by the mobile device, a second request for a second image sprite containing the group of third image assets, wherein the second request identifies the group of third image assets.

13. A computing device, comprising:

at least one processor; and at least one memory device having computer-executable instructions stored thereon that, in response to execution by the at least one processor, cause the computing system to perform operation comprising:

generating a request for an image sprite containing multiple image assets to be presented in at least one user interface, wherein the request identifies the multiple image assets;

sending the request to a content source platform;

receiving from the content source platform, the image sprite and metadata corresponding to the image sprite;

storing the metadata in the non-volatile storage device;

extracting using the metadata, the multiple image assets from the image sprite; and presenting a subset of the multiple assets during presentation of a first user interface of the at least one user interface.

14. The computing device of claim 13, wherein the first user interface has a defined layout of sections corresponding to respective visual elements, and wherein the presenting comprises, loading a first image asset of the multiple image assets into a volatile memory device of the mobile device; and causing a display device integrated into the mobile device to present the first image asset in a first section of the defined layout.

15. The computing device of claim 14, further comprising, determining, by the computing device, that the particular image asset satisfies a retention rule;

retaining, by the computing device, the particular image asset in the non-volatile storage device;

determining that a subset of the multiple image assets fails to satisfy the retention rule; and deleting the subset of the multiple image assets from the non-volatile storage device.

16. The computing device of claim 13, wherein the request comprises one of a uniform resource locator (URL) comprising a listing of the multiple image assets.

17. The computing device of claim 13, wherein the metadata includes first data defining a first attribute of a first image asset of the multiple image assets and second data defining a second attribute of the first image asset, and wherein the extracting comprises, identifying, using the metadata, the particular image asset within the image sprite; and storing the particular image asset in the non-volatile storage device.

18. The computing device of claim 17, wherein the storing comprises, generating a file containing the particular image asset in a filesystem within the non-volatile storage device; and indexing the file.

19. The computing device of claim 13, further comprising, initiating, by the computing device, presentation of a second user interface having a defined layout of sections corresponding to respective visual elements;

identifying, by the computing device, a first image asset to be included in the second user interface;

determining, by the computing device, that the first image asset is available in the non-volatile storage device; and causing the display device to present the first image asset in a first section of the defined layout.

20. The computing device of claim 13, further comprising, initiating, by the computing device, presentation of a second user interface;

identifying, by the computing device, second multiple image assets to be included in the second user interface, wherein the second multiple image assets include a first image asset of the multiple image assets, a second image asset of the multiple image assets, and a group of third image assets;

determining, by the computing device, that the group of third image assets is unavailable within the non-volatile storage device;

generating, by the mobile device, a second request for a second image sprite containing the group of third image assets, wherein the second request identifies the group of third image assets.

* * * * *